(12) United States Patent
Nakamura

(10) Patent No.: US 10,248,002 B2
(45) Date of Patent: Apr. 2, 2019

(54) OPTICAL CIRCUIT, AND OPTICAL SWITCH USING SAME

(71) Applicant: NEC Corporation, Minato-ku, Tokyo (JP)

(72) Inventor: Shigeru Nakamura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 10 days.

(21) Appl. No.: 15/561,135

(22) PCT Filed: Mar. 22, 2016

(86) PCT No.: PCT/JP2016/001630
§ 371 (c)(1),
(2) Date: Sep. 25, 2017

(87) PCT Pub. No.: WO2016/157819
PCT Pub. Date: Oct. 6, 2016

(65) Prior Publication Data
US 2018/0052380 A1    Feb. 22, 2018

(30) Foreign Application Priority Data

Mar. 30, 2015 (JP) .................................. 2015-068460

(51) Int. Cl.
*G02F 1/313* (2006.01)
*G02F 1/225* (2006.01)
(Continued)

(52) U.S. Cl.
CPC ............ *G02F 1/3136* (2013.01); *G02F 1/225* (2013.01); *G02F 1/3138* (2013.01); *H04Q 11/00* (2013.01);
(Continued)

(58) Field of Classification Search
CPC .................................................... G02F 1/3135
(Continued)

(56) References Cited

U.S. PATENT DOCUMENTS 5,044,715 A * 9/1991 Kawachi ............ G02B 6/12004
385/14
5,278,923 A * 1/1994 Nazarathy ............... G02F 1/225
385/1
(Continued)

FOREIGN PATENT DOCUMENTS

JP    H08-500683 A    1/1996
JP    2006-038897 A   2/2006
(Continued)

OTHER PUBLICATIONS

International Search Report for PCT Application No. PCT/JP2016/001630, dated Jun. 28, 2016.
(Continued)

*Primary Examiner* — Kaveh C Kianni (57) ABSTRACT

In an optical circuit using a Mach-Zehnder-type element, it is difficult to obtain an optical circuit which has a less wavelength dependence and is suitable for achieving high integration. Accordingly, an optical circuit according to the present invention includes: a first Mach-Zehnder-type element including a first branch waveguide, a first branching/combining unit connected to one end of the first branch waveguide, and a second branching/combining unit connected to another end of the first branch waveguide and having a branch configuration different from that of the first branching/combining unit; and a second Mach-Zehnder-type element including a second branch waveguide, a third branching/combining unit connected to one end of the second branch waveguide, and a fourth branching/combining unit connected to another end of the second branch waveguide and having a branch configuration different from that of the third branching/combining unit. The first branch waveguide and the second branch waveguide each include a phase difference adjustment means. In the second branching/combining unit and the third branching/combining unit, light
(Continued)

coupling between two basic modes with a phase inverted and a higher-order mode, is smaller than that in the first branching/combining unit and the fourth branching/combining unit. The first Mach-Zehnder-type element and the second Mach-Zehnder-type element are connected with each other through the second branching/combining unit and the third branching/combining unit.

3 Claims, 6 Drawing Sheets

(51) Int. Cl.
  *H04Q 11/00* (2006.01)
  *G02F 1/31* (2006.01)
  *G02B 6/35* (2006.01)
(52) U.S. Cl.
  CPC ....... *H04Q 11/0005* (2013.01); *G02B 6/3542* (2013.01); *G02B 6/3546* (2013.01); *G02B 6/3596* (2013.01); *G02F 2001/311* (2013.01); *G02F 2203/04* (2013.01); *H04Q 2011/0035* (2013.01)
(58) Field of Classification Search
  USPC .......................................................... 385/14
  See application file for complete search history.

(56) References Cited

U.S. PATENT DOCUMENTS

| | | | | |
|---|---|---|---|---|
| 5,469,257 A * | 11/1995 | Blake | ................... | G01C 19/721 356/464 |
| 5,572,611 A * | 11/1996 | Jinguji | ............... | G02B 6/12007 385/17 |
| 5,832,155 A * | 11/1998 | Rasch | ................ | G02B 6/12004 385/48 |
| 5,915,051 A * | 6/1999 | Damask | ............ | G02B 6/12007 385/14 |
| 6,400,490 B1 * | 6/2002 | Hosoi | ..................... | G02F 1/225 359/254 |
| 6,616,353 B1 * | 9/2003 | Helkey | ................... | G02F 1/225 356/450 |
| 6,937,782 B2 * | 8/2005 | Robinson | ............. | G02F 1/3515 385/16 |
| 7,005,669 B1 * | 2/2006 | Lee | ........................ | B82Y 10/00 257/14 |
| 7,171,067 B2 * | 1/2007 | Doerr | ................. | G02B 6/12021 385/14 |
| 7,505,640 B2 * | 3/2009 | Little | .................... | B82Y 20/00 385/11 |
| 7,555,180 B2 * | 6/2009 | Bulthuis | ............ | G02B 6/12007 385/28 |
| 9,020,307 B2 * | 4/2015 | Ishikawa | ............ | G02B 6/12019 385/129 |
| 9,568,801 B2 * | 2/2017 | Sugiyama | ............... | G02F 1/011 |
| 9,678,288 B2 * | 6/2017 | Takahashi | ............ | G02B 6/4209 |
| 2002/0191886 A1 * | 12/2002 | Castoldi | ............. | G02B 6/12004 385/14 |
| 2004/0008965 A1 * | 1/2004 | Betty | ..................... | G02F 1/2257 385/140 |
| 2004/0067022 A1 * | 4/2004 | Chen | .................. | G02B 6/12007 385/42 |
| 2004/0126072 A1 * | 7/2004 | Hoon Lee | .............. | B82Y 10/00 385/122 |
| 2006/0109477 A1 * | 5/2006 | Zhou | .................. | G01B 9/02091 356/479 |
| 2011/0110624 A1 * | 5/2011 | Kamei | ............... | G02B 6/12016 385/24 |
| 2011/0116802 A1 * | 5/2011 | Kamei | ............... | G02B 6/12019 398/87 |
| 2011/0243556 A1 * | 10/2011 | Nagarajan | .............. | H04B 10/40 398/43 |
| 2013/0322809 A1 * | 12/2013 | Goh | .................. | H04B 10/5161 385/3 |
| 2013/0322815 A1 | 12/2013 | Watanabe et al. | | |
| 2014/0334769 A1 | 11/2014 | Nakamura | | |
| 2015/0241633 A1 | 8/2015 | Kusaka et al. | | |
| 2016/0025930 A1 | 1/2016 | Hasegawa et al. | | |
| 2016/0139485 A1 * | 5/2016 | Winzer | ................. | G02F 1/2255 385/3 |

FOREIGN PATENT DOCUMENTS

| | | |
|---|---|---|
| JP | 2006-292872 A | 10/2006 |
| JP | 2009-157114 A | 7/2009 |
| JP | 2009-210788 A | 9/2009 |
| JP | 2012-173707 A | 9/2012 |
| JP | 2014-041254 A | 3/2014 |
| WO | 2012/111316 A1 | 8/2012 |
| WO | 2012/153817 A1 | 11/2012 |
| WO | 2014/167800 A1 | 10/2014 |

OTHER PUBLICATIONS

English translation of Written opinion for PCT Application No. PCT/JP2016/001630.

* cited by examiner

OPTICAL CIRCUIT, AND OPTICAL SWITCH USING SAME

This application is a National Stage Entry of PCT/JP2016/001630 filed on Mar. 22, 2016, which claims priority from Japanese Patent Application 2015-068460 filed on Mar. 30, 2015, the contents of all of which are incorporated herein by reference, in their entirety.

TECHNICAL FIELD

The present invention relates to an optical circuit and an optical switch using the optical circuit, and more particularly, to an optical circuit using a Mach-Zehnder-type element and an optical switch using the optical circuit.

BACKGROUND ART

An optical fiber communication system is required to have a configuration including an optical layer that can deal with demands such as a rapid provision of a new service, a rapid response to an unexpected traffic fluctuation, and an efficient high-speed failure recovery. In particular, the optical fiber communication system is required to have a function capable of flexibly setting an optical path specified by a wavelength or a fiber. In order to achieve a flexible setting of an optical path, various optical circuits such as an optical switch are required. Accordingly, an optical circuit in which various functional elements each formed by using an optical waveguide are integrated has been actively developed. As an optical waveguide, a silicon optical waveguide having a configuration including a combination of a core that is formed of silicon and a clad that is formed of silica, in addition to a conventional combination of a core and a clad that are each formed of silica, so that a refractive index difference is increased, has been actively developed recently.

An example of an optical circuit using such an optical waveguide is described in PTL 1. An optical switch described in PTL 1 includes, as a basic configuration, a Mach-Zehnder interferometer (MZI) which is composed of two 2×2-type directional couplers and two arm waveguides of a short-arm-side waveguide and a long-arm-side waveguide which couple the 2×2-type directional couplers. At least one of the coupling waveguides is provided with a phase shifter for changing a phase of guided light by changing a refractive index of the waveguide.

Lengths of the two coupling waveguides have an optical path length difference corresponding to a half wavelength of an operation wavelength. Signal light input from one of the 2×2-type directional couplers is directed to a bar path in accordance with the interference principle when a phase shifter is not operated. On the other hand, when a phase shift amount 7C corresponding to a half wavelength is generated in the phase shifter to eliminate the optical path length difference, the signal light is directed to a cross path.

An on/off ratio (a ratio between a transmittance in an OFF state and a transmittance in an ON state) of such an optical switch is theoretically infinite. However, in practice, the on/off ratio is not infinite due to incompleteness in production of an optical switch to be prepared, such as a phase error, polarization conversion, and scattered light. Accordingly, in PTL 1, a configuration of a double Mach-Zehnder interferometer (MZI) in which two switch elements are cascade-connected is used to obtain a high on/off ratio.

This double MZI optical switch has a connection configuration of, in a path (on-path) from an input port to an output port, passing through two-stage MZI switch elements including a pre-stage MZI switch element and a subsequent-stage MZI switch element, each of which includes a short-side waveguide and a long-side waveguide. In the on-path, light leaking from a first-stage element in the double MZI optical switch is also blocked in a second-stage element. Accordingly, an on/off ratio about twice that of a switch with a single element can be obtained in decibels.

Further, in the optical switch described in PTL 1, the upper side of the pre-stage MZI switch is the short-side waveguide, the lower side is the long-side waveguide. The subsequent-stage MZI switch is the long-side waveguide at the upper side, the lower side is the short-side waveguide. The waveguides are symmetrically disposed with respect to a central line in the pre-stage/subsequent-stage.

Incidentally, as a branching/combining unit that constitutes a Mach-Zehnder-type element, a directional coupler or a multi mode interferometer (MMI) is used for a 2×2-type, and the MMI or a Y-branch is used for a 1×2-type. However, the 2×2-type branching/combining unit used for the optical switch described in PTL 1 exhibits a wavelength dependence larger than that of the 1×2-type branching/combining unit. Particularly, in a small-size structure with strong optical confinement, like in a silicon optical waveguide, the wavelength dependence further increases. Accordingly, when a small wavelength dependence characteristic is required, it is desirable to use the 1×2-type branching/combining unit.

An example of an optical waveguide element using such a 1×2-type branching/combining unit is described in PTL 2. The optical waveguide element described in PTL 2 includes a Mach-Zehnder-type optical modulator. This Mach-Zehnder-type optical modulator includes a 1×2-type optical branching unit that branches one input light beam into two output light beams, a 1×2-type optical combining unit that combines two input light beams into one output light beam, and an optical modulation unit. One of output light beams from the optical branching unit is input to the optical combining unit through a waveguide including the optical modulation unit, and the other one of the output light beams from the optical branching unit is input to the optical combining unit through a waveguide that does not include the optical modulation unit. The optical modulation unit is a phase modulator. When the light that propagates through the optical modulation unit and the light that propagates without passing through the optical modulation unit are input into the optical combining unit with a predetermined phase difference, light combined by the optical combining unit is modulated depending on the phase difference.

As described above, in recent years, in order to increase a degree of integration of an optical circuit, a silicon photonics technology using an optical waveguide having a core formed of silicon and a clad formed of silica has been attracting attention. In this silicon optical waveguide, high-intensity light is confined by utilizing a high specific refractive index difference between the core of silicon and the clad of silica, and a fine core structure, thereby obtaining a sharply bent optical waveguide. Accordingly, it is expected that an optical circuit having a high integration degree is achieved. Further, expectation for the silicon photonics technology has been raised because such a fine optical circuit with high integration can be produced on a large-diameter wafer by utilizing a process technology accumulated for silicon integrated circuits.

When a degree of integration of the optical circuit is planned to improve by using a silicon optical waveguide, a size of each element constituting the optical circuit and an interval of disposed elements decrease. Accordingly, in order to obtain a high on/off ratio in the optical switch, it is important to design the circuit so as to obtain a high light blocking amount in the OFF state.

In the double MZI optical switch described in PTL 1, the first-stage Mach-Zehnder-type element sets an optical path to an OFF state, and the subsequent-stage Mach-Zehnder-type element further attenuates light intensity of a slight amount of leaking light propagating through the optical waveguide. However, when the subsequent-stage Mach-Zehnder-type elements are disposed at a short interval, deterioration in a light blocking amount is caused not only by light propagating through the optical waveguide in a basic mode, but also higher-order mode light that cannot propagate through a long optical waveguide. Further, deterioration in a light blocking amount is also caused when light that is emitted from the optical waveguide but remains within a surface on which the optical circuit is formed is likely to be recombined to the subsequent-stage element. A configuration for suppressing deterioration in the light blocking amount of the optical switch due to such non-propagating light is required.

As an example of such a configuration, the optical waveguide element using the 1×2-type branching/combining unit described in the above-mentioned PTL 2 has a configuration including a mode splitter capable of mode separation (separation of a basic mode and a higher-order mode). The mode splitter includes a primary waveguide and a secondary waveguide provided apart from the primary waveguide, and is provided at a subsequent stage which is an output side of the optical multiplexing unit of the Mach-Zehnder-type optical modulator. Output light from the optical multiplexing unit is input into the mode splitter through an output side waveguide. With such a configuration, only higher-order mode light is separated from the primary waveguide to the secondary waveguide, while suppressing a loss of basic mode light, thereby making it possible to eliminate the higher-order mode light from the output light from the optical multiplexing unit.

Further, PTL 3 describes a technique as a related art.

CITATION LIST

Patent Literature

[PTL 1] Japanese Unexamined Patent Application Publication No. 2009-157114 (paragraphs [0003] to [0005] and [0025])
[PTL 2] Japanese Unexamined Patent Application Publication No. 2014-041254 (paragraphs [0017] to [0019])
[PTL 3] Japanese Translation of PCT International Publication for Patent Application, No. H08-500683

SUMMARY OF INVENTION

Technical Problem

In the optical waveguide element using the 1×2-type branching/combining unit as described in the above-mentioned PTL 2, the waveguide at the output side of the optical multiplexing unit causes a TE (Transverse Electric)-like basic mode and a TM (Transverse Magnetic)-like basic mode to propagate. However, higher-order mode in which light spreads on both sides of the waveguide can also propagate through a short section of the waveguide. In the Mach-Zehnder-type element using the 1×2-type branching/combining unit at the output side, these higher-order modes are likely to occur in the OFF state. Accordingly, when the distance to the subsequent-stage element is short, there is a need for providing a configuration for attenuating these higher-order modes.

Meanwhile, a configuration in which two switch elements are cascade-connected like in the double MZI optical switch described in PTL 1 makes it possible to obtain a high on/off ratio.

However, the present inventor has found, based on an analysis result, that, when connection is established by using the 1×2-type branching/combining unit, one-port-side higher-order mode and two-port-side basic mode with an inverted phase are coupled together relatively strongly, which affects the on/off ratio in the Mach-Zehnder-type element. Specifically, in the 1×2-type branching/combining unit, when light beams are incident on the branching/combining unit from the two-port-side, respectively, and a phase difference between the light beams is 0, the light beams exited from the one-port side strengthen each other and propagate through the waveguide in the basic mode. On the other hand, when the phase difference is π, the light beams exited from the one-port-side weaken each other and the most part of the light intensity is emitted to a surrounding area. However, at the same time, light propagating through the waveguide in the higher-order mode toward an end part of the one-port-side is generated.

On the contrary, when light propagating through the waveguide in the higher-order mode is incident on the branching/combining unit from the one-port-side, the higher-order mode light can be coupled to the basic mode of the optical waveguide having end parts corresponding to the two port side, respectively, with the phase difference π. Accordingly, when Mach-Zehnder-type elements are connected in two stages at a short interval to obtain a high light blocking amount in the OFF state, it is necessary to suppress effects on the higher-order mode.

In order to separate the higher-order mode described above, the optical waveguide element described in the above-mentioned PTL 2 has a configuration in which only the higher-order mode light spreading over a wide area is coupled to the secondary waveguide disposed in proximity to the primary waveguide. Further, in the configuration, the basic mode in which light is strongly confined in the primary waveguide is not coupled to the secondary waveguide. With this configuration, an amount of light that propagates through the primary waveguide and is recombined to the subsequent-stage element or the optical waveguide of an exit unit is suppressed to prevent deterioration in a light blocking amount.

However, the optical waveguide element described in PTL 2, which has a configuration in which a mode splitter composed of a primary waveguide and a secondary waveguide is provided at an output side of an optical multiplexing unit, requires a length of a certain section. Accordingly, it is necessary to increase an interval between elements, which causes a problem that it is difficult to achieve high integration.

Thus, the optical circuit using a Mach-Zehnder-type element has a problem that it is difficult to obtain an optical circuit that has a less wavelength dependence and is suitable for achieving high integration.

An object of the present invention is to provide an optical circuit that solves a problem that it is difficult to obtain an optical circuit using a Mach-Zehnder-type element which has a less wavelength dependence and is suitable for achieving high integration, which is the problem described above, and an optical switch using the optical circuit.

Solution to Problem

An optical circuit according to the present invention includes: a first Mach-Zehnder-type element including a first branch waveguide, a first branching/combining unit connected to one end of the first branch waveguide, and a second branching/combining unit connected to another end of the first branch waveguide and having a branch configuration different from that of the first branching/combining unit; and a second Mach-Zehnder-type element including a second branch waveguide, a third branching/combining unit connected to one end of the second branch waveguide, and a fourth branching/combining unit connected to another end of the second branch waveguide and having a branch configuration different from that of the third branching/combining unit. The first branch waveguide and the second branch waveguide each include a phase difference adjustment means. In the second branching/combining unit and the third branching/combining unit, light coupling between two basic modes with a phase inverted and a higher-order mode is smaller than that in the first branching/combining unit and the fourth branching/combining unit. The first Mach-Zehnder-type element and the second Mach-Zehnder-type element are connected with each other through the second branching/combining unit and the third branching/combining unit.

Advantageous Effects of Invention

According to an optical circuit of the present invention and an optical switch using the optical circuit, it is possible to obtain an optical circuit that uses a Mach-Zehnder-type element, has a less wavelength dependence, and is suitable for achieving high integration.

DESCRIPTION OF EMBODIMENTS

Example embodiments of the present invention will be described below with reference to the drawings.

First Example Embodiment

Figure 1:
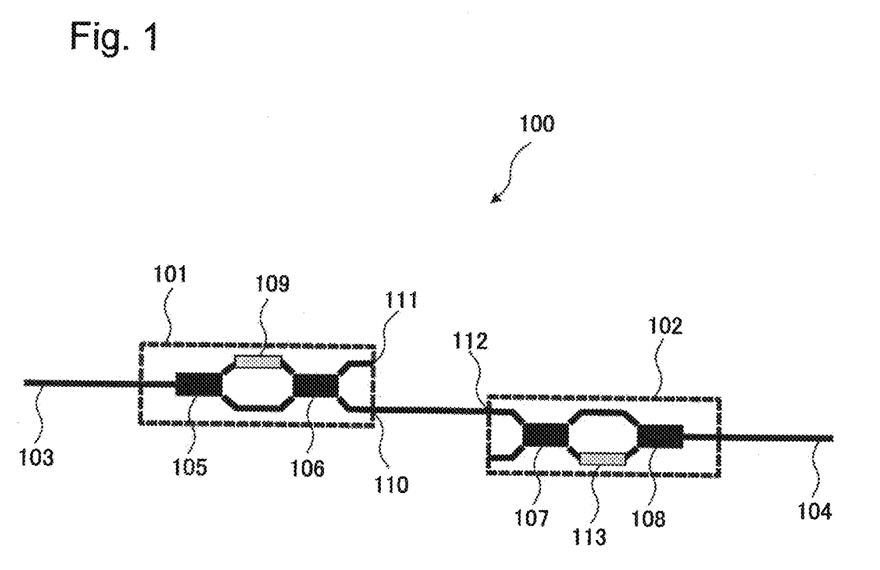
FIG. 1 is a block diagram illustrating a configuration of an optical circuit according to a first example embodiment of the present invention.

FIG. 1 is a block diagram illustrating a configuration of an optical circuit 100 according to a first example embodiment of the present invention.

The optical circuit 100 includes a first Mach-Zehnder-type element 101 and a second Mach-Zehnder-type element 102. The first Mach-Zehnder-type element 101 includes a first branch waveguide, a first branching/combining unit 105 which is connected to one end of the first branch waveguide, and a second branching/combining unit 106 which is connected to another end of the first branch waveguide and has a branch configuration different from that of the first branching/combining unit. The second Mach-Zehnder-type element 102 includes a second branch waveguide, a third branching/combining unit 107 which is connected to one end of the second branch waveguide, and a fourth branching/combining unit 108 which is connected to another end of the second branch waveguide and has a branch configuration different from that of the third branching/combining unit 107.

In this case, the first branch waveguide and the second branch waveguide each include a phase difference adjustment means. The second branching/combining unit 106 and the third branching/combining unit 107 have a configuration in which light coupling between two basic modes and a higher-order mode each with a phase inverted is smaller than that in the first branching/combining unit 105 and the fourth branching/combining unit 108. Further, the first Mach-Zehnder-type element 101 and the second Mach-Zehnder-type element 102 are connected together through the second branching/combining unit 106 and the third branching/combining unit 107.

In this case, the first branching/combining unit 105 and the fourth branching/combining unit 108 may be 1×2-type branching/combining units and the second branching/combining unit 106 and the third branching/combining unit 107 may be 2×2-type branching/combining units. The optical circuit 100 having such a configuration will be described in more detail below.

The optical circuit 100 may have a configuration in which the first Mach-Zehnder-type element 101 and the second Mach-Zehnder-type element 102 are connected together through a port 110 of the first Mach-Zehnder-type element 101 and a port 112 of the second Mach-Zehnder-type element 102. In this case, the first Mach-Zehnder-type element 101 includes the 1×2-type branching/combining unit 105 and the 2×2-type branching/combining unit 106. The second Mach-Zehnder-type element 102 includes the 2×2-type branching/combining unit 107 and the 1×2-type branching/combining unit 108. Light is input from a port 103 which is connected to the first Mach-Zehnder-type element 101, and the light is output to a port 104 which is connected to the second Mach-Zehnder-type element 102.

One of branch waveguides (arms) constituting the first Mach-Zehnder-type element 101 and the second Mach-Zehnder-type element 102 is provided with each of heaters 109 and 113 for generating a refractive index change by local heating. The heaters 109 and 113 constitute a phase difference adjustment means.

Among optical waveguides of the 2×2-type branching/combining units 106 and 107 connecting the first Mach-Zehnder-type element 101 and the second Mach-Zehnder-type element 102, respectively, an optical waveguide that is not connected to another element is desirably provided with a terminal structure.

Figure 2:
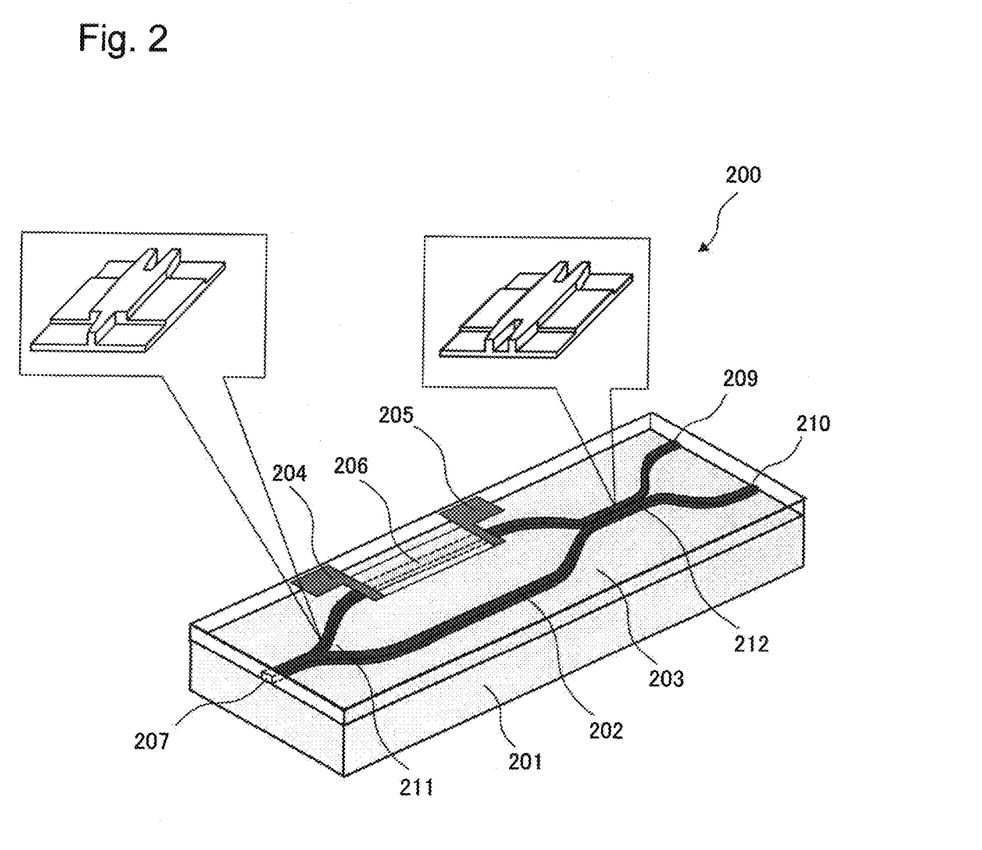
FIG. 2 is a perspective view illustrating a configuration of a Mach-Zehnder-type element included in the optical circuit according to the first example embodiment of the present invention.

FIG. 2 illustrates a structure of a Mach-Zehnder-type element 200 that is shared by the first Mach-Zehnder-type element 101 and the second Mach-Zehnder-type element 102. The Mach-Zehnder-type element 200 includes an optical waveguide composed of a core 202 using silicon and a clad 203 using quarts which are formed on a silicon substrate 201.

The Mach-Zehnder-type element 200 includes an input port 207 and output ports 209 and 210. Light is temporarily branched by a branching/combining unit 211 and the branched light beams interfere with each other at a branching/combining unit 212. The distribution of the intensity of light to the two output ports is determined by a phase difference between light beams in the both arms (branch waveguides) at this time. In this case, a 1×2-type branching/combining unit is used as the branching/combining unit 211 and a 2×2-type branching/combining unit is used as the branching/combining unit 212.

A heater 206 is provided above one of the arms. A current is applied to the heater 206 through electrodes 204 and 205 to thereby perform local heating, and a refractive index change is generated along with the temperature change. In a case where no current is applied to the heater 206, when light beams input from the port 207 interfere with each other at the port 209 via the both arms, the phase difference is 0 and thus the light beams strengthen each other, while when the light beams interfere with each other at the port 210, the phase difference is π and thus the light beams weaken each other. Accordingly, the optical path from the input port 207 to the output port 209 is set to an ON state and the optical path from the input port 207 to the output port 210 is set to an OFF state. On the other hand, in a case where a predetermined current is applied to the heater 206, when the light beams input from the port 207 interfere with each other at the port 209 via the both arms, the phase difference is π and thus the light beams weaken each other, while when the light beams interfere with each other at the port 210, the phase difference is 0 and thus the light beams strengthen each other. Accordingly, the optical path from the input port 207 to the output port 210 is set to an ON state and the optical path from the input port 207 to the output port 209 is set to an OFF state.

In the optical circuit 100 illustrated in FIG. 1, when the optical path from the port 103 to the port 104 is set to an ON state, a predetermined current is applied to the heaters 109 and 113. On the other hand, when the optical path from the port 103 to the port 104 is set to an OFF state, no current is applied to the heaters 109 and 113. The light blocking amount obtained in the OFF state is important to obtain a high on/off ratio.

In the OFF state, the light input from the port 103 is branched by the branching/combining unit 105 and then interferes with each other at the branching/combining unit 106. At the port 110, the phase difference is π and thus the light beams interfere with each other and weaken each other, while at a port 111, the phase difference is 0 and thus the light beams interfere with each other and strengthen each other. Accordingly, the most part of the light intensity is guided to the port 111. At the port 110, the basic mode light leaks and a slight higher-order mode is generated. However, since the branching/combining unit 106 is a 2×2-type branching/combining unit, the amount of generated higher-order mode is small. These light beams are input to the subsequent-stage second Mach-Zehnder-type element 102 through the port 112.

The basic mode which has passed through the port 112 is branched by the branching/combining unit 107 of the second Mach-Zehnder-type element 102 and then, the branched light beams interfere with each other at the branching/combining unit 108. At the port 104, the phase difference is π and thus the light beams interfere with each other and weaken each other, so that a further light attenuation is received. The higher-order mode which has passed through the port 112 is coupled to the basic mode at the both arms in the branching/combining unit 107. At this time, a phase difference of the basic mode generated at the both arms is 0, and the phase difference is 0 at the port 104 connected to the branching/combining unit 108, and thus the light beams interfere with each other and strengthen each other. However, since the branching/combining unit 107 is a 2×2-type branching/combining unit, the amount of the higher-order mode incident from the port 112 to be coupled to the basic mode at the both arms can be suppressed.

Specifically, in the optical circuit 100 according to this example embodiment, light beams of the basis mode leaking from the output port 110 of a first stage of the first Mach-Zehnder-type element 101 weaken each other and interfere each other at the output port 104 of a second stage of the second Mach-Zehnder-type element 102, so that a further light attenuation is received. Further, in the optical circuit 100 of this example embodiment, the branching/combining unit 106 at the output side of the first-stage first Mach-Zehnder-type element 101 and the branching/combining unit 107 at the input side of the second-stage second Mach-Zehnder-type element 102 are both 2×2-type branching/combining units. Accordingly, the amount of generated higher-order mode leaking from the output port 110 of the first-stage first Mach-Zehnder-type element 101, and recombining from the higher-order mode to the basic mode in the second-stage second Mach-Zehnder-type element 102 can be suppressed. Thus, the light blocking amount obtained in the OFF state can be increased. Accordingly, even in a configuration in which the first Mach-Zehnder-type element 101 and the second Mach-Zehnder-type element 102 are disposed in proximity to each other to achieve high integration, a high on/off ratio can be obtained.

Further, the optical circuit 100 of this example embodiment has a configuration in which the number of 2×2-type branching/combining units to be used is minimized by combination use with 1×2-type branching/combining units, thereby obtaining flat wavelength characteristics in the ON state.

As described above, according to the optical circuit 100 of this example embodiment, it is possible to obtain an optical circuit that uses a Mach-Zehnder-type element, has a less wavelength dependence and is suitable for achieving high integration.

Second Example Embodiment

Next, a second example embodiment of the present invention will be described.

Figure 3:
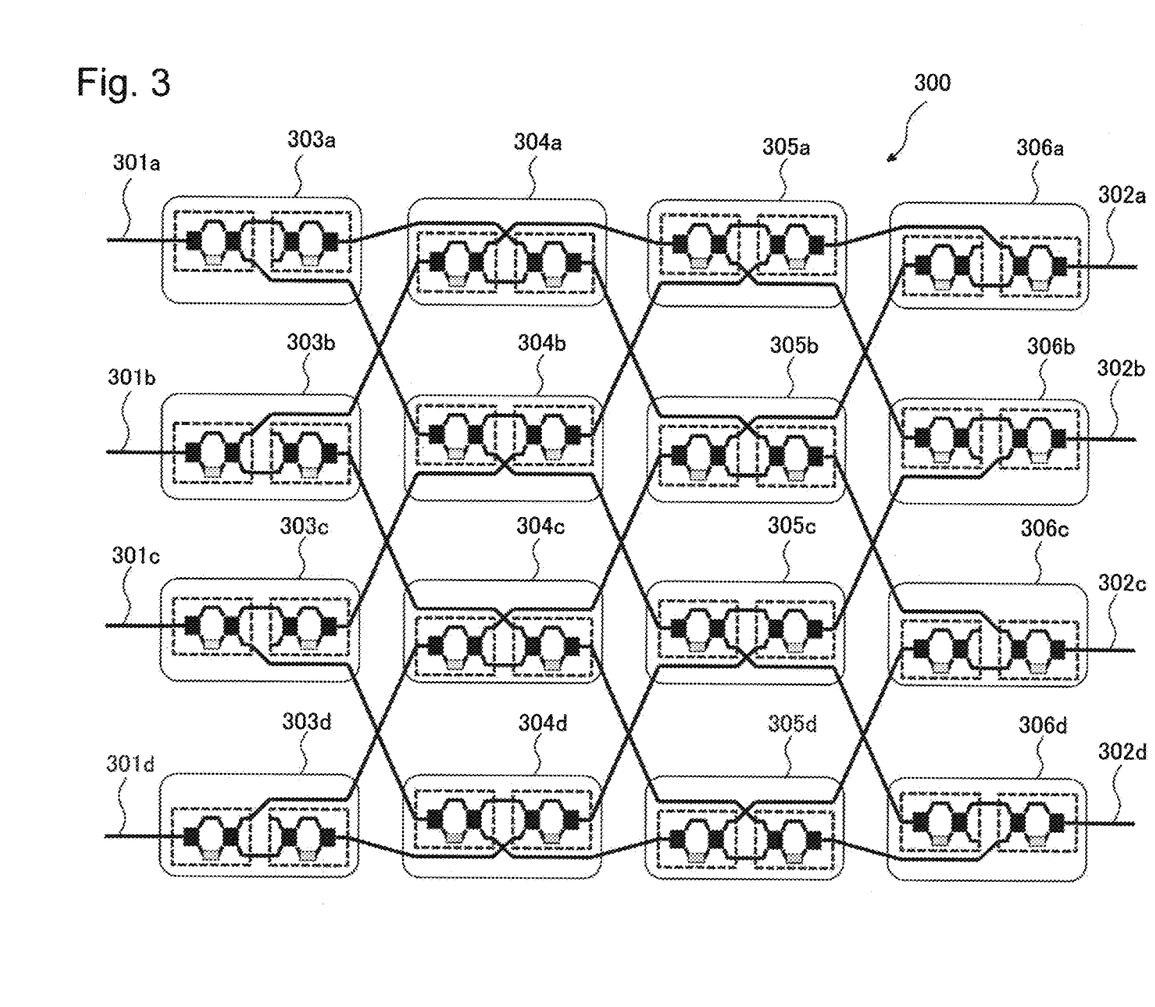
FIG. 3 is a block diagram illustrating a configuration of an optical switch according to a second example embodiment of the present invention.

FIG. 3 illustrates a configuration of an optical switch 300 according to a second example embodiment of the present invention. The optical switch 300 according to this example embodiment is a 4×4-type optical switch including four input ports and four output ports.

The optical switch 300 has a configuration in which input ports 301a to 301d and output ports 302a to 302d are connected together by 16 optical path switching units 303a to 303d, 304a to 304d, 305a to 305d, and 306a to 306d. In this case, the optical path switching units use two Mach-Zehnder-type elements as a unit, and have a configuration similar to that of the optical circuit 100 according to the first example embodiment.

Next, an operation of the optical switch 300 according to this example embodiment will be described.

First, an example in which an optical path from the port 301a to the port 302c is set to an ON state will be described. A current for local heating is applied to a heater included in each of two Mach-Zehnder-type elements constituting the optical path switching unit 303a. Thus, the light signal input from the port 301a passes through the optical path switching unit 303a, and then sequentially passes through the optical path switching units 304a, 305b, and 306c and is guided to the port 302c.

On the contrary, when the optical path from the port 301a to the port 302c is set to an OFF state, no current is applied to the heater included in the Mach-Zehnder-type elements constituting the optical path switching unit 303a. Accordingly, the light signal input from the port 301a passes through two Mach-Zehnder-type elements in which no current is applied to the heater in the optical path switching unit 303a. Accordingly, the light blocking amount in the OFF state in the optical path from the optical path switching unit 303a to the optical path switching unit 304a is determined by the amount of light attenuation received by the two Mach-Zehnder-type elements when the light passes through the optical path switching unit 303a. In this case, the optical path switching unit 303a is configured to include: a first-stage Mach-Zehnder-type element including a 1×2-type branching/combining unit disposed at an input side and a 2×2-type branching/combining unit disposed at an output side; a second-stage Mach-Zehnder-type element including a 2×2-type branching/combining unit disposed at an input side and a 1×2-type branching/combining unit disposed at an output side. Accordingly, a high light blocking amount can be obtained like in the optical circuit 100 according to the first example embodiment. As a result, a high on/off ratio can be obtained in the optical path from the port 301a to the port 302c. Also in an optical path from another input port to another output port, a high on/off ratio can be obtained.

In this manner, according to the optical switch 300 according to this example embodiment, a high on/off ratio can be obtained. In addition, since the optical circuit that has a less wavelength dependence and is suitable for achieving high integration is used, an optical switch having a high on/off ratio and a less wavelength dependence can be obtained even when high integration is achieved.

Third Example Embodiment

Next, a third example embodiment of the present invention will be described.

Figure 4:
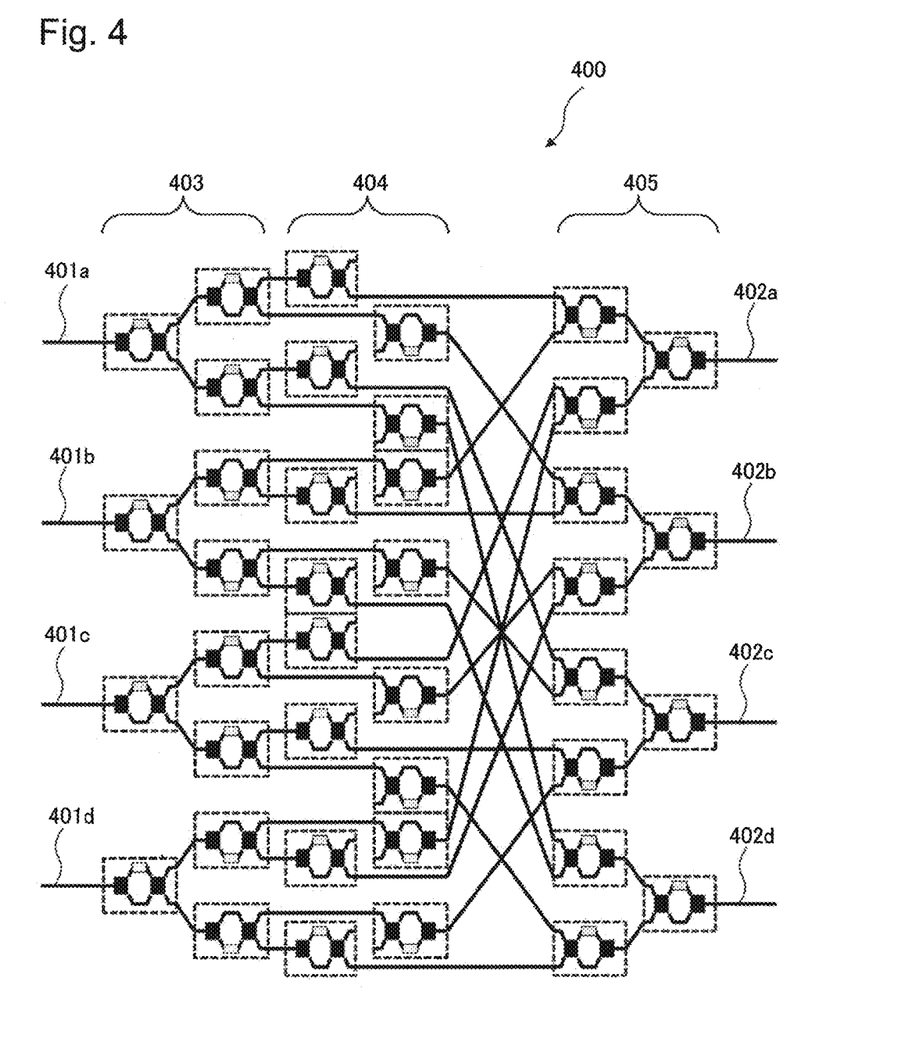
FIG. 4 is a block diagram illustrating a configuration of an optical switch according to a third example embodiment of the present invention.

FIG. 4 illustrates a configuration of an optical switch 400 according to the third example embodiment of the present invention. The optical switch 400 according to this example embodiment is a 4×4-type optical switch including four input ports and four output ports.

The optical switch 400 has a configuration in which four input ports 401a to 401d and four output ports 402a to 402d are respectively connected through a selector unit 403, a gate unit 404, and a selector unit 405 which are each composed of a Mach-Zehnder-type element. In this case, the selector units 403 and 405 and the gate unit 404 are connected together through two Mach-Zehnder-type elements. This configuration is similar to the configuration of the optical circuit 100 according to the first example embodiment. In other words, a light blocking amount in an OFF state of the optical path is determined by the amount of light attenuation received by one Mach-Zehnder-type element of one of the selector units 403 and 405 and one Mach-Zehnder-type element of the gate unit 404.

For example, the light blocking amount in the OFF state of the optical path from the port 401a to the 402a of the optical switch 400 is determined by the amount of light attenuation given by the Mach-Zehnder-type element of the gate unit 404 and the Mach-Zehnder-type element of the selector unit 405. This connection is configured by: a first-stage Mach-Zehnder-type element including a 1×2-type branching/combining unit disposed at an input side and a 2×2-type branching/combining unit disposed at an output side; and a second-stage Mach-Zehnder-type element including a 2×2-type branching/combining unit disposed at an input side and a 1×2-type branching/combining unit disposed at an output side. Accordingly, a high light blocking amount can be obtained. As a result, in the optical path from the port 401a to the port 402a, a high on/off ratio can be obtained. Also in an optical path between another input port and another output port, a high on/off ratio can be obtained.

In this manner, according to the optical switch 400 of this example embodiment, a high on/off ratio can be obtained. Further, since the optical circuit that has a less wavelength dependence and is suitable for achieving high integration is used, an optical switch having a high on/off ratio and a less wavelength dependence can be obtained even when high integration is achieved.

Fourth Example Embodiment

Next, a fourth example embodiment of the present invention will be described.

Figure 5:
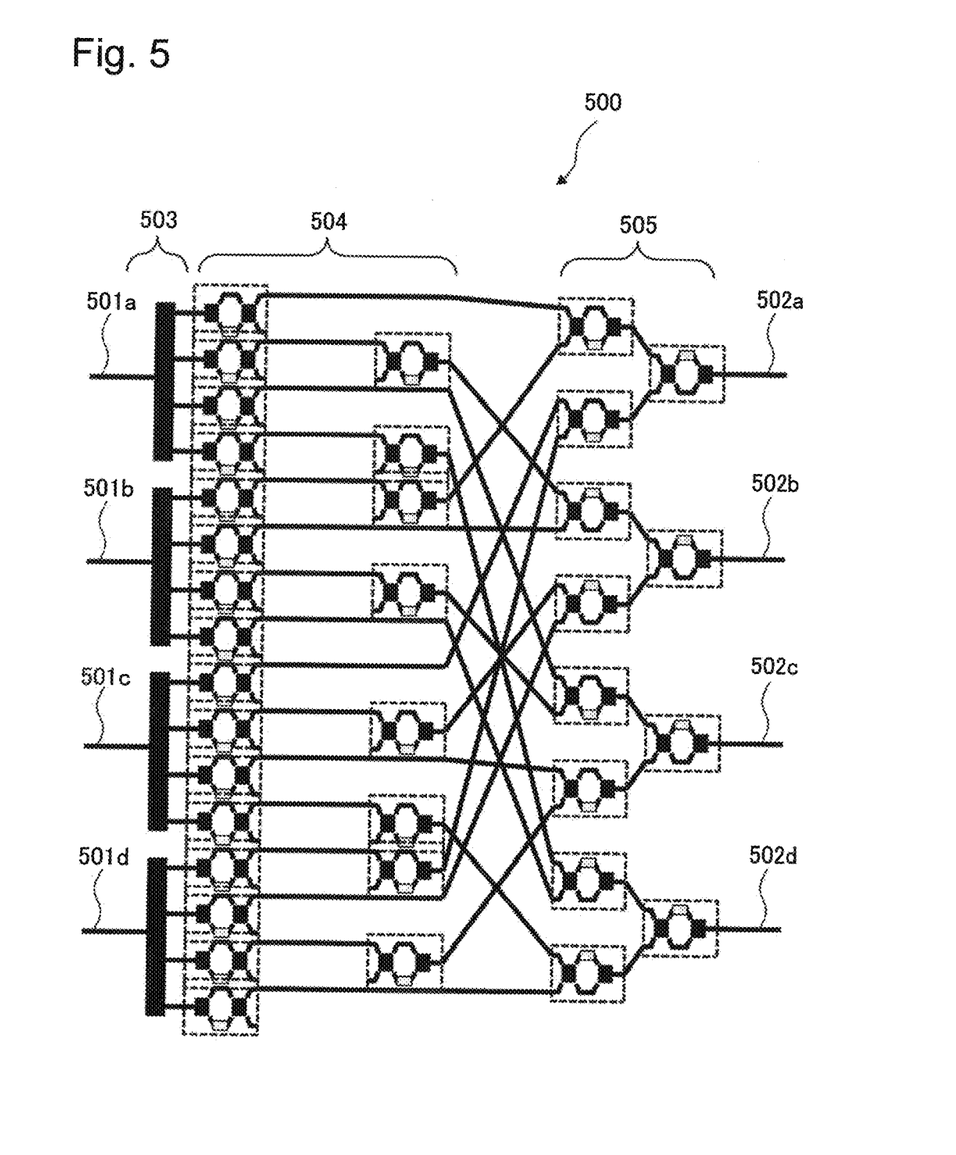
FIG. 5 is a block diagram illustrating a configuration of an optical switch according to a fourth example embodiment of the present invention.

FIG. 5 illustrates a configuration of an optical switch 500 according to the fourth example embodiment of the present invention. The optical switch 500 according to this example embodiment is a 4×4-type optical switch including four input ports and four output ports.

The optical switch 500 has a configuration in which four input ports 501a to 501d and four output ports 502a to 502d are respectively connected through a splitter unit 503, and a gate unit 504 and a selector unit 505 which are each composed of a Mach-Zehnder-type element. In this case, the connection between the gate unit 504 and the selector unit 505 and the connection within the gate unit 504 are configured through two Mach-Zehnder-type elements. This configuration is similar to the configuration of the optical circuit 100 according to the first example embodiment. In other words, a light blocking amount in an OFF state of the optical path is determined by the amount of light attenuation received by one Mach-Zehnder-type element of the gate unit 504 and one Mach-Zehnder-type element of the selector unit 505 or two Mach-Zehnder-type elements of the gate unit 504.

For example, the light blocking amount in the OFF state of the optical path from the port 501a to the port 502a of the optical switch 500 is determined by the amount of light attenuation given by the Mach-Zehnder-type element of the gate unit 504 and the Mach-Zehnder-type element of the selector unit 505. This connection is configured by: a first-stage Mach-Zehnder-type element including a 1×2-type branching/combining unit disposed at an input side and a 2×2-type branching/combining unit disposed at an output side; and a second-stage Mach-Zehnder-type element including a 2×2-type branching/combining unit disposed at the input side and a 1×2-type branching/combining unit disposed at the output side. Accordingly, a high light blocking amount can be obtained. As a result, in the optical path from the port 501a to the port 502a, a high on/off ratio can be obtained. Also in an optical path between another input port and another output port, a high on/off ratio can be obtained.

In this manner, according to the optical switch 500 of this example embodiment, a high on/off ratio can be obtained. Further, since the optical circuit that has a less wavelength dependence and is suitable for achieving high integration is used, an optical switch having a high on/off ratio and a less wavelength dependence can be obtained even when high integration is achieved.

Fifth Example Embodiment

Next, a fifth example embodiment of the present invention will be described.

Figure 6:
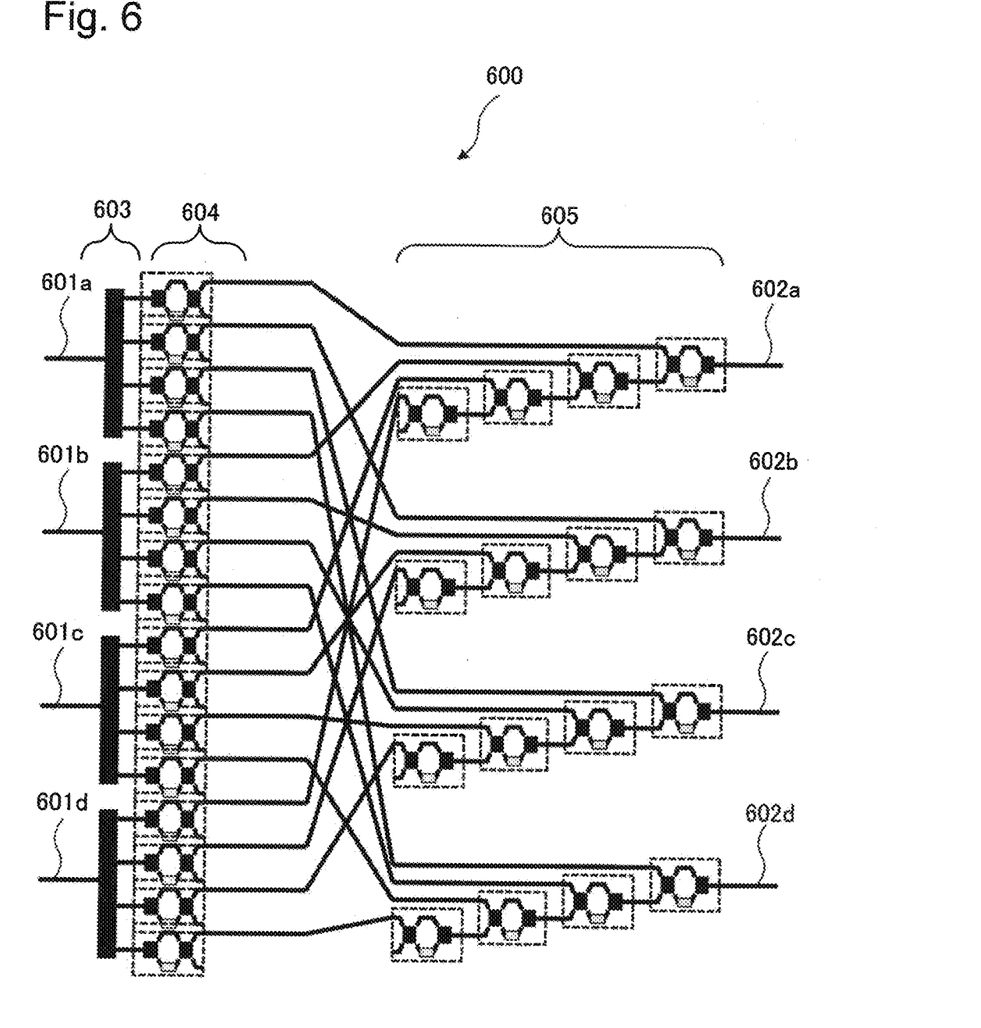
FIG. 6 is a block diagram illustrating a configuration of an optical switch according to a fifth example embodiment of the present invention.

FIG. 6 illustrates a configuration of an optical switch 600 according to the fifth example embodiment of the present invention. The optical switch 600 according to this example embodiment is a 4×4-type optical switch including four input ports and four output ports.

The optical switch 600 has a configuration in which four input ports 601a to 601d and four output ports 602a to 602d are respectively connected through a splitter unit 603, and a gate unit 604 and a selector unit 605 which are each composed of a Mach-Zehnder-type element. In this case, the connection between the gate unit 604 and the selector unit 605 is configured through two Mach-Zehnder-type elements. This configuration is similar to the configuration of the optical circuit 100 according to the first example embodiment. In other words, a light blocking amount in the OFF state of the optical path is determined by the amount of light attenuation received by one Mach-Zehnder-type element of the gate unit 604 and one Mach-Zehnder-type element of the selector unit 605.

For example, a light blocking amount in the OFF state of the optical path from the port 601a to the port 602a of the optical switch 600 is determined by the amount of light attenuation given by the Mach-Zehnder-type element of the gate unit 604 and the Mach-Zehnder-type element of the selector unit 605. This connection is configured by: a first-stage Mach-Zehnder-type element including a 1×2-type branching/combining unit disposed at an input side and a 2×2-type branching/combining unit disposed at an output side; and a second-stage Mach-Zehnder-type element including a 2×2-type branching/combining unit disposed at an input side and a 1×2-type branching/combining unit disposed at an output side. Accordingly, a high light blocking amount can be obtained. As a result, in the optical path from the port 601a to the port 602a, a high on/off ratio can be obtained. Also in an optical path between another input port and another output port, a high on/off ratio can be obtained.

In this manner, according to the optical switch 500 of this example embodiment, a high on/off ratio can be obtained. Further, since the optical circuit that has a less wavelength dependence and is suitable for achieving high integration is used, an optical switch having a high on/off ratio and a less wavelength dependence can be obtained even when high integration is achieved.

The above example embodiments illustrate a case where an optical circuit includes a waveguide having a waveguide core formed of silicon and having a clad formed of silica glass. However, the configuration of the waveguide is not limited to this. A waveguide having a core and a clad which are each formed of silica glass, a waveguide having a core and a clad which are each formed of compound semiconductor, and a waveguide having a core and a clad which are each formed of an organic material may be used. In other words, advantageous effects similar to those described above can be obtained regardless of the constituent material of the waveguide.

The present invention has been described above with reference to example embodiments described above as exemplary embodiments. However, the present invention is not limited to the example embodiments described above. In other words, the present invention can be applied to various aspects that can be understood by those skilled in the art within the scope of the present invention.

This application is based upon and claims the benefit of priority from Japanese patent application No. 2015-068460, filed on Mar. 30, 2015, the disclosure of which is incorporated herein in its entirety by reference.

REFERENCE SIGNS LIST

100 Optical circuit
101 First Mach-Zehnder-type element
102 Second Mach-Zehnder-type element
103 to 104, 110 to 112 Port
105 First branching/combining unit
106 Second branching/combining unit
107 Third branching/combining unit
108 Fourth branching/combining unit
109, 113 Heater
200 Mach-Zehnder-type element
201 Silicon substrate
202 Core
203 Clad
204, 205 Electrode
206 Heater
207, 301a to 301d, 401a to 401d, 501a to 501d, 601a to 601d Input port
209, 210, 302a to 302d, 402a to 402d, 502a to 502d, 602a to 602d Output port
211 1×2-type branching/combining unit
212 2×2-type branching/combining unit
300, 400, 500, 600 Optical switch
303a to 303d, 304a to 304d, 305a to 305d, 306a to 306d Optical path switch
403, 405, 505, 605 Selector unit
404, 504, 604 Gate unit
503, 603 Splitter unit

What is claimed is:

1. An optical circuit comprising:
a first Mach-Zehnder-type component including a first branch waveguide, a first branching/combining unit connected to one end of the first branch waveguide, and a second branching/combining unit connected to another end of the first branch waveguide and having a branch configuration different from that of the first branching/combining unit; and
a second Mach-Zehnder-type component including a second branch waveguide, a third branching/combining unit connected to one end of the second branch waveguide, and a fourth branching/combining unit connected to another end of the second branch waveguide and having a branch configuration different from that of the third branching/combining unit,
wherein the first branch waveguide and the second branch waveguide each include a thermo-optical phase difference adjuster,
wherein in the second branching/combining unit and the third branching/combining unit, light coupling between two basic modes with a phase inverted and a higher-order mode is smaller than that in the first branching/combining unit and the fourth branching/combining unit, wherein the first Mach-Zehnder-type component and the second Mach-Zehnder-type component are connected with each other through the second branching/combining unit and the third branching/combining unit, wherein an OFF state of the optical circuit is provided by an absence of current applied to the thermo-optical phase difference adjuster for setting a phase difference of $\pi$ between arms of the first and the second Mach-Zehnder type components, and wherein an ON state of the optical circuit is provided by a presence of current applied to the thermo-optical phase difference adjuster for setting a phase difference of 0 between arms of the first and the second Mach-Zehnder type components.

2. The optical circuit according to claim 1, wherein the first branching/combining unit and the fourth branching/combining unit are 1×2-type branching/combining units, and wherein the second branching/combining unit and the third branching/combining unit are 2×2-type branching/combining units.

3. The optical circuit according to claim 1, wherein all of an optical waveguide, constituting each of the first branch waveguide, the second branch waveguide, the first branching/combining unit, the second branching/combining unit, the third branching/combining unit, and the fourth branching/combining unit, is a silicon optical waveguide including a core having a silicon material as a principal component and a clad having a silica material as a principal component.

* * * * *